(12) United States Patent  
Garman (10) Patent No.: US 9,392,904 B2  
(45) Date of Patent: Jul. 19, 2016

(54) GRILL AND METHOD OF ASSEMBLING SAME

(71) Applicant: Hamilton Beach Brands, Inc., Glen Allen, VA (US)

(72) Inventor: Michael Garman, Moseley, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 437 days.

(21) Appl. No.: 14/017,801

(22) Filed: Sep. 4, 2013

(65) Prior Publication Data

US 2014/0069412 A1    Mar. 13, 2014

Related U.S. Application Data

(60) Provisional application No. 61/698,104, filed on Sep. 7, 2012.

(51) Int. Cl.
*A47J 37/07* (2006.01)
*B23P 19/00* (2006.01)

(52) U.S. Cl.
CPC .......... *A47J 37/0704* (2013.01); *A47J 37/0763* (2013.01); *A47J 37/0786* (2013.01); *B23P 19/00* (2013.01); *A47J 2037/0777* (2013.01); *Y10T 29/49826* (2015.01)

(58) Field of Classification Search
USPC ................................ 126/30, 38, 26
See application file for complete search history.

(56) References Cited

U.S. PATENT DOCUMENTS

| | | | |
|---|---|---|---|
| 6,257,229 B1 | 7/2001 | Stewart et al. |
| 6,257,259 B1 | 7/2001 | Ardouin |
| 6,606,987 B2 | 8/2003 | DeMars |
| 6,851,564 B2 | 2/2005 | Ng |
| 6,910,475 B2 | 6/2005 | Zelek et al. |
| 6,910,476 B2 | 6/2005 | Johnson et al. |
| 6,976,485 B2 | 12/2005 | Johnson et al. |
| 6,981,497 B2 | 1/2006 | DeMars |
| 7,762,249 B2 | 7/2010 | Johnson et al. |
| 7,958,882 B1 | 6/2011 | Sgourides |
| 2005/0252504 A1 | 11/2005 | Cabrera et al. |
| 2007/0290486 A1 | 12/2007 | Chung |
| 2009/0095277 A1 | 4/2009 | Johnson et al. |
| 2010/0269814 A1 | 10/2010 | May et al. |

*Primary Examiner* — Avinash Savani
(74) *Attorney, Agent, or Firm* — Alexander D. Raring (57) ABSTRACT

A grill includes a cooking unit defining a heating cavity for receiving and heating foodstuff. A base supports the cooking unit above a support surface. The base includes a first side baffle and an opposing second side baffle. Each baffle includes a first plate pivotally attached to a second plate. The plates are pivotable between a first configuration in which the plates extend generally parallel to one another and the support surface and a second configuration in which the plates extend generally parallel to and abutting one another and generally perpendicularly to the support surface to form a side baffle. A lid is pivotally attached to at least a portion of the cooking unit to selectively open and close the heating cavity.

10 Claims, 11 Drawing Sheets

GRILL AND METHOD OF ASSEMBLING SAME

CROSS-REFERENCE TO RELATED APPLICATIONS

The present application claims priority to U.S. Provisional Application No. 61/698,104, filed Sep. 7, 2012 and titled "Easy Assemble Outdoor Grill," the subject matter of which is herein incorporated by reference.

BACKGROUND OF THE DISCLOSURE

The present disclosure is directed to a grill and a method of assembling a grill and, more particularly, to an outdoor barbeque grill that can be stored or transported in a compact state and assembled or erected in a relatively short amount of time and generally without the use of tools.

Barbeque grills, such as those on outdoor decks, patios and the like, are well known. Conventional grills can be relatively large and unwieldy. As a result, conventional grills can be costly to store or transport. In addition, conventional grills include a multitude of separate parts or components that must be properly assembled prior to use. Since many retailers do not assemble conventional grills at least due to the increased cost in doing so, many consumers are required to perform the time consuming and often frustrating task of assembling the grills prior to first use.

In light of the above, certain grills have been designed to collapse or assemble in a relatively quick time period. However, conventional collapsible grills include a multitude of moving components that are difficult, awkward and/or time consuming to properly configure. In addition, conventional collapsible grills are not aesthetically pleasing and at least give the appearance of instability being cheaply made. When assembled, they do not imitate a conventionally assembled grill.

It has heretofore not been discovered how to create a grill that is capable of being stored or transported in a generally compact configuration and being assembled to a generally expanded use configuration in a relatively short period of time and generally without the use of tools. The device of the following disclosure accomplishes the above and other objectives and overcomes at least the above-described disadvantages of conventional grills.

BRIEF SUMMARY OF THE DISCLOSURE

Briefly stated, one aspect of the present disclosure is directed to a method of assembling a grill placing at least a bottom of a grill in a compact configuration on a support surface and raising at least a portion of the grill upwardly with respect to the support surface such that the bottom of the grill generally maintains contact with the support surface and side baffles of the grill automatically unfold from the compact configuration to an expanded configuration. In the expanded configuration, the side baffles extend generally perpendicularly to the support surface to support the grill.

In another aspect, the present disclosure is directed to a grill including a cooking unit defining a heating cavity for receiving and heating foodstuff. A base supports the cooking unit above a support surface. The base includes a first side baffle and an opposing second side baffle. Each baffle includes a first plate pivotally attached to a second plate. The plates are pivotable between a first configuration in which the plates extend generally parallel to one another and the support surface, and a second configuration in which the plates extend generally parallel to and abutting one another and generally perpendicularly to the support surface. A lid is pivotally attached to at least a portion of the cooking unit to selectively open and close the heating cavity.

In yet another aspect, the present disclosure is directed to a grill including a cooking unit defining a heating cavity for receiving and heating foodstuff. The cooking unit includes a lid for selectively opening and closing the heating cavity. A base supports the cooking unit above a support surface. The base includes a first side baffle and an opposing second side baffle. Each side baffle includes a first plate pivotally attached to a second plate. The plates are pivotable between a first configuration and a second configuration. In the first configuration, the plates extend generally parallel to one another and the support surface. In the second configuration, the plates extend generally parallel to and abutting one another and generally perpendicularly to the support surface to form a side baffle. At least one door is movable about a first axis between a folded position and an unfolded position. In the folded position, the door extends into an interior of the base and generally parallel and proximate to a bottom of the base. In the unfolded position, the door forms a front wall of the base and extends generally perpendicularly to the bottom of the base. The door is pivotable about a second axis between an open position and a closed position. In the open position, the door exposes an interior of the base. A rear baffle is movable between a folded position and an unfolded position. In the folded position, the rear baffle extends into an interior of the base and generally parallel and proximate to a top of the base. In the unfolded position, the rear baffle forms at least a portion of a rear wall of the base and extends generally perpendicularly to the top of the base.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-16 illustrate a grill, generally designated 10, in accordance with a first preferred embodiment of the present disclosure. The grill 10 is intended or designed for heating, cooking or otherwise preparing foodstuff (none shown) to be consumed by a user. As described in detail below, the grill 10 eases and/or expedites initial set-up for the manufacturer, the retailer and/or the end consumer/user. The grill 10 may be an outdoor barbeque grill powered by fuel, such as propane, natural gas or the like. However, the present disclosure is not limited by the type of grill or the foodstuff (not shown) prepared by the user. For example, the grill 10 may be powered by electricity or charcoal, for example, or may be used as a rotisserie.

As shown in FIGS. 1-16, the grill 10 includes a cooking unit 12 that defines a heating cavity 14 (FIGS. 12-16) for receiving and heating foodstuff. The cooking unit 12 or a portion thereof may be referred to as a "fire box." The cooking unit 12 may contain one or more spaced-apart burners (not shown) operatively connected to fuel, such as propane in a tank 30 (shown in phantom in FIG. 2), natural gas or electricity. The burners covert potential energy in the form of fuel or electricity into kinetic energy in the form of a flame or heat. Alternatively, the burners may operatively connect to a natural gas line (not shown), as is understood by those skilled in the art.

An exterior of the cooking unit 12 may include one or more control dials or buttons 32, which allow a user to control operation of the burners. Operation of the burners and the control dials 32 is well known to those skilled in the art and, therefore, will not be described in further detail herein. The cooking unit 12 is not limited to the inclusion of burners and/or control dials 32, as the cooking unit 12 may be used to hold charcoal or another burning medium to heat the foodstuff, as is understood by those skilled in the art.

Figure 1:
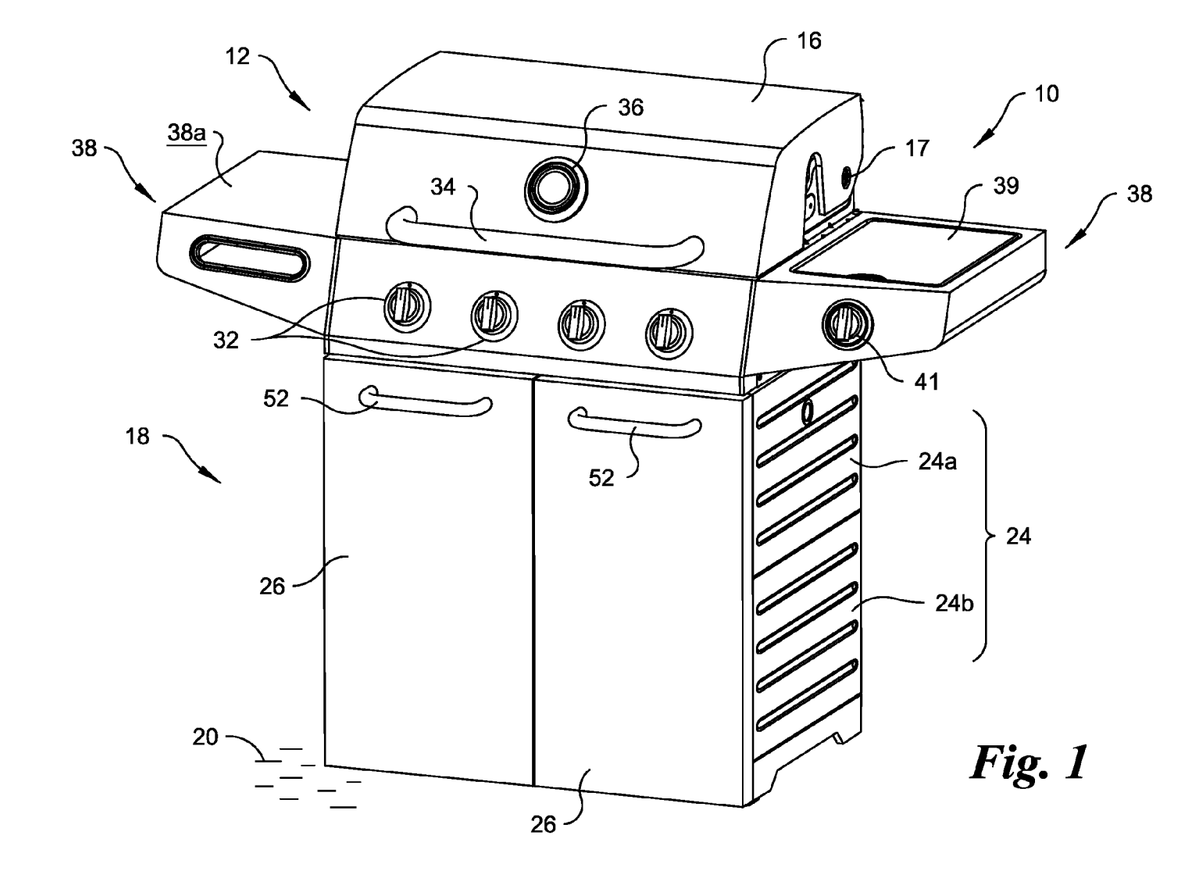
FIG. 1 is a front perspective view of a grill in accordance with a first embodiment of the present disclosure, wherein the grill is shown in a fully assembled configuration.

The cooking unit 12 includes a lid 16 that is pivotable or removable to allow the user to selectively open and close the heating cavity 14. One or more hinges 17 (FIG. 2) may pivotally attach a rear portion of the lid 16 to a rear portion of the cooking unit 12. The term "hinge" is broadly defined herein is any type of joint or bearing, such as a barrel hinge, a concealed hinge and the like. As shown in FIG. 1, a handle 34 may extend outwardly from a portion of the lid 16 to assist the user in opening and/or closing the lid 16. A temperature indicator 36 (FIG. 1) may be mounted on a front side of the lid 16 and operatively connected to a thermometer (not shown) on or within the cooking unit 12 to display a temperature of the heating cavity 14. The foodstuff may be heated within the heating cavity 14 with the lid 16 either in the open (FIG. 16) or the closed (FIG. 1) positions, or any position therebetween.

Figure 2:
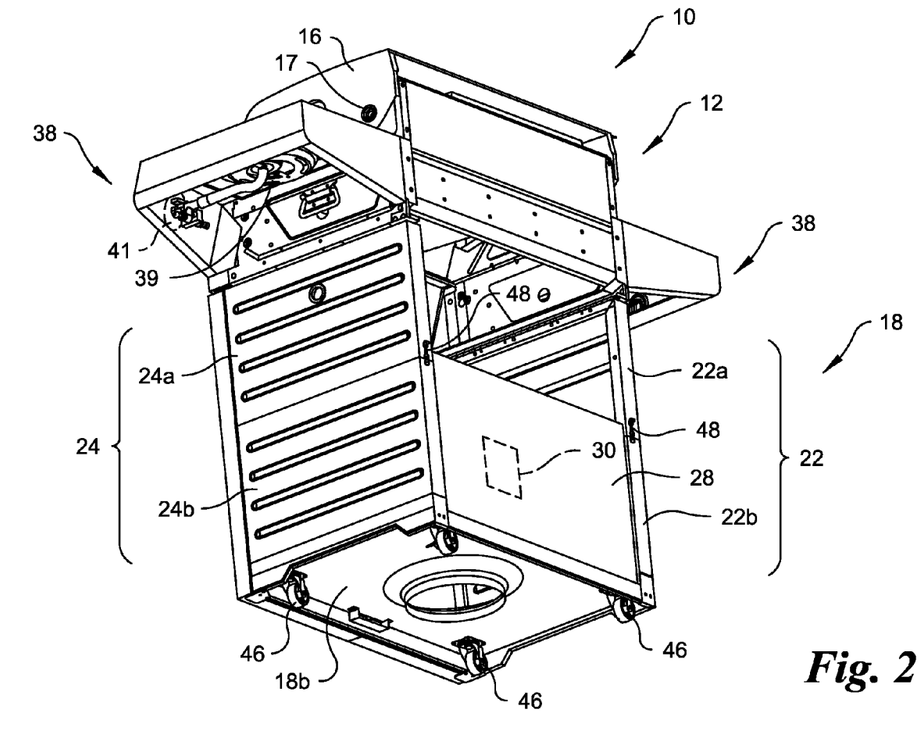
FIG. 2 is a rear bottom perspective view of the grill of FIG. 1.
Figure 3:
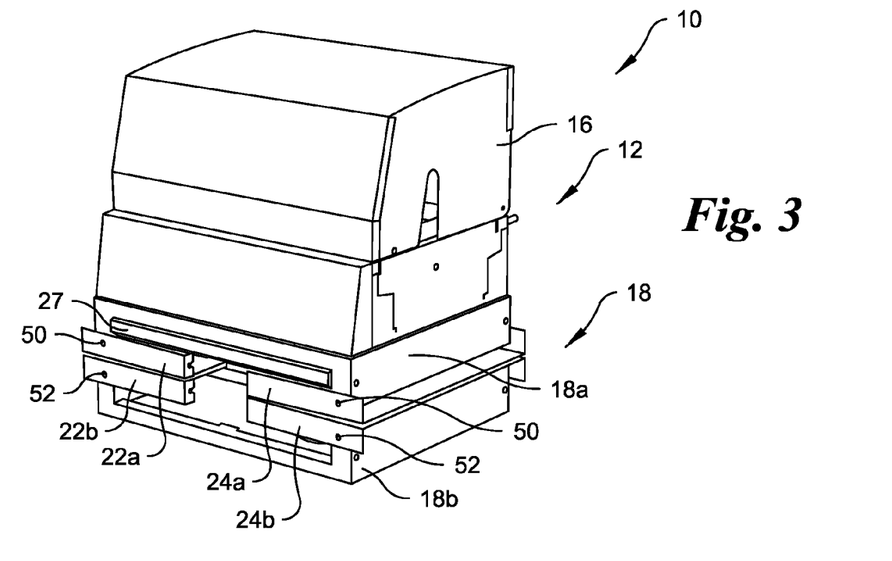
FIG. 3 is a front perspective schematic view of the grill of FIG. 1, wherein the grill is shown is a storage or transport configuration.

The grill 10 may include one or more shelves 38 that allow the user to support or suspend foodstuff or other objects (such as utensils or plates) above the deck, grand or other support surface 20. Additionally, as shown in FIGS. 1 and 2, either or both of the shelves 38 may include a skillet or additional burner 39 that may be controlled by an additional control knob or button 41. When the grill 10 is in use, the shelves 38 preferably extend laterally outwardly from the cooking unit 12 in a use position. In the use position, a top surface 38a of each shelf 38 preferably extends in the same or generally the same plane as a grate (not shown) within the heating cavity 14 that supports the foodstuff to be heated. When the grill 10 is not in use, the shelves 38 may be placed or otherwise stored entirely within the cooking unit 12 and/or the heating cavity 14 in a storage position. The shelves 38 may be pivotally attached to the cooking unit 12 or removably attachable thereto. For instance, one or more hinges 40 (see FIGS. 13-16) may attach a portion of each shelf 38 to an outer peripheral portion of the cooking unit 12. Alternatively, the shelves 38 may be separable from the cooking unit 12 and reattached in a desired position or orientation, as described below with respect to another embodiment of the present disclosure. Following use of the grill 10, the shelves 38 may be pivoted or moved inwardly into the heating cavity 14 of the cooking unit 12 (see FIG. 12).

Referring to FIGS. 12-16, either or both of the shelves 38 may include a tray 42 attached thereto. One or more hinges 44 may pivotally attach each tray 42 to the respective shelf 38. Each tray 42 preferably folds beneath or above the respective shelf 38 so as to fit within the heating cavity 14 of the cooking unit 12 when the lid 16 is in a closed position. When the shelves 38 are in the open or expanded position (see FIGS. 14-16), the respective tray 42 preferably pivots or unfolds outwardly from below the shelf 38 toward the front of the grill 10. Each tray 42 may be pivoted to the outward or use position (see FIGS. 14-16) for aesthetic purposes. Alternatively or additionally, each tray 42 may include one or more buttons, knobs, levers or switches (not shown) that provide the user with additional control over the grill 10.

The grill 10 also includes a base 18 that supports the cooking unit 12 above a support surface 20. The support surface 20 may be the ground surface, such as a deck, a patio or grass. However, the support surface 20 may be a table top, a counter top or at least a portion of another support structure. As shown in FIGS. 3-16, an upper portion or top 18a of the base 18 is preferably fixedly attached to a lower end or bottom of the cooking unit 12. However, the base 18 may be removably attachable to the cooking unit 12. An outer periphery of the base 18 preferably at least generally, if not exactly, matches an outer periphery of the bottom of the cooking unit 12. As shown in FIG. 2, one or more spaced-apart castors or wheels 46 may be attached to and extend downwardly from a lower portion or bottom 18b of the base 18.

A distinguishing feature of the grill 10 is that the base 18 provides the capability for the grill 10 to expand and/or collapse between a fully assembled configuration (FIG. 1) and a storage or transportation configuration (FIG. 3) in a relatively short amount of time (e.g., less than 60 seconds). The above-described reconfiguration can be accomplished generally or completely without the use of conventional tools (not shown), such as a hammer or a screwdriver. In essence, the base 18 is composed of a plurality of walls or panels that fold or bend into a generally compact configuration (see FIG. 3), which allows a plurality of grills 10 to be stored and/or transported in a finite amount of space. The base 18 folds and unfolds, or collapses and expands, without increasing the overall footprint of the base 18. A single user may collapse or expand the base 18, or two opposing users may combine to collapse or expand the base, as described in detail below.

In particular, referring to each of FIGS. 1-16, the base 18 includes a first or left side baffle 22 and an opposing second or right side baffle 24. The side baffles 22, 24 may be referred to herein as "legs" or sidewalls of the base 18, and each preferably provides a continuous surface to enclose an interior of the base 18. Each side baffle 22, 24 includes a generally flat or planar first plate 22a, 24a pivotally attached to a generally flat or planar second plate 22b, 24b. The first plates 22a, 24a may be pivotally attached to the top 18a of the base 18 by one or more hinges 50 (see FIGS. 3 and 4). Similarly, the second plates 22b, 24b may be pivotally attached to the bottom 18b of the base 18 by one or more hinges 52 (see FIGS. 3 and 4).

Figure 4:
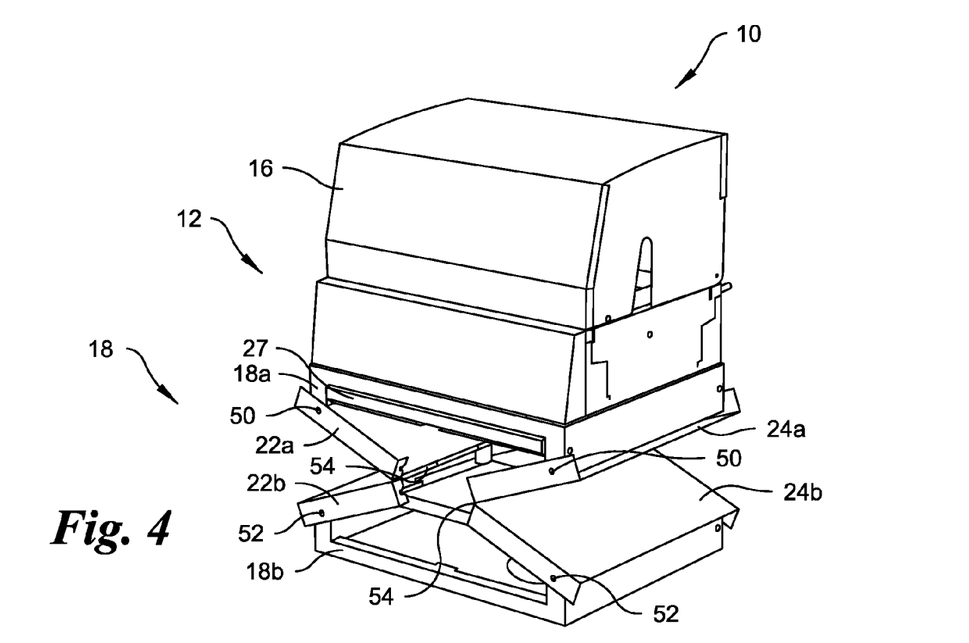
FIG. 4 is a front perspective schematic view of the grill of FIG. 1, wherein the grill is shown in a partially assembled configuration.
Figure 5:
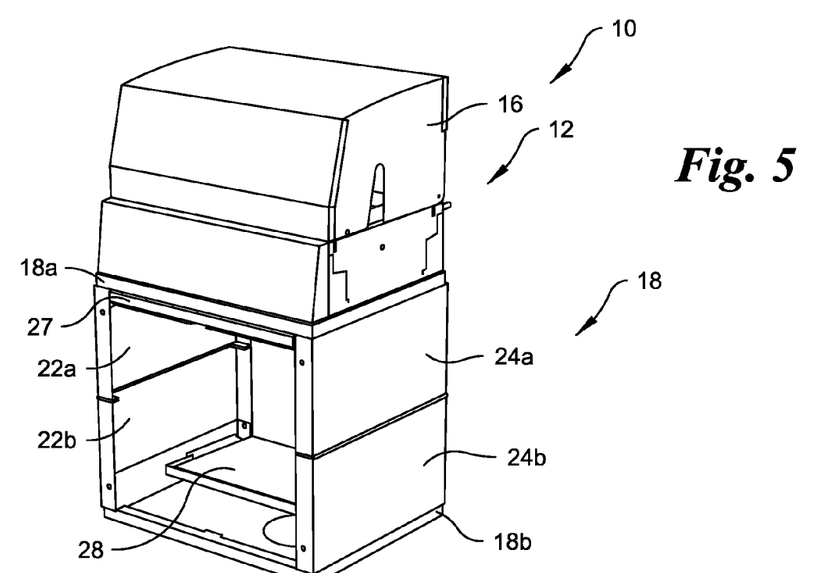
FIG. 5 is a front perspective schematic view of the grill of FIG. 1, wherein the grill is shown in another partially assembled configuration.
Figure 6:
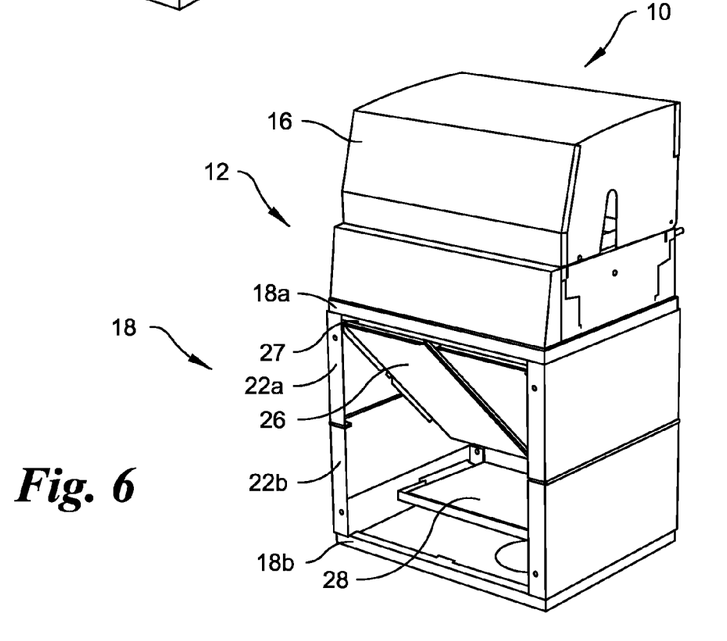
FIG. 6 is a front perspective schematic view of the grill of FIG. 1, wherein the grill is shown in a yet another partially assembled configuration.
Figure 7:
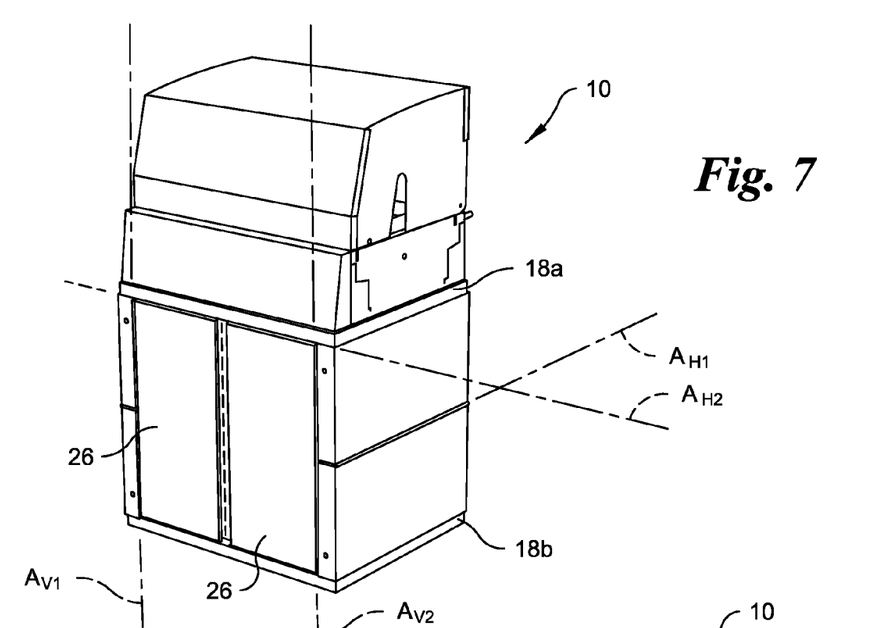
FIG. 7 is a front perspective schematic view of the grill of FIG. 1, wherein the grill is shown in still another partially assembled configuration.

As shown in FIG. 4, one or more hinges 54 preferably pivotally attach the first and second plates 22a, 22b, 24a, 24b, respectively, about a first horizontal axis $A_{H1}$ (see FIG. 7). The plates 22a, 22b, 24a, 24b are pivotable between a first, folded or collapsed configuration (see FIG. 3) and a second, unfolded or assembled configuration (see FIGS. 1, 2 and 5-16). In the first configuration, the plates 22a, 22b, 24a, 24b extend generally, if not exactly, parallel to one another and the support surface 20. Exterior surfaces of the respective pair of plates 22a, 22b, 24a, 24b may be in engagement or contact when in the first configuration. In the second configuration, the plates 22a, 22b, 24a, 24b extend generally parallel to one another and generally perpendicularly to the support surface 20. When the plates 22a, 22b, 24a, 24b are in the second configuration, the cooking unit 12 is preferably raised a predetermined height from the support surface 20 so as to be ergonomically comfortable for the user to operate the grill 10. Each plate 22a, 22b, 24a, 24b may have a height that is generally, if not exactly, one half of the total height of the base 18 and/or each side baffle 22, 24.

As shown in FIGS. 1, 2 and 6-16, the base 18 includes at least one and preferably a pair of pivotable doors 26. The doors 26 may be partially or completely surrounded by a frame 27 (FIGS. 3-6) that allows the user to move the doors 26 as a single unit into and out of a first, folded or collapsed configuration, through a partially unfolded configuration (FIG. 6), and to a second, unfolded or assembled configuration (FIGS. 1, 2 and 7-16). In the first configuration, it is preferred that the door(s) 26 is/are proximate to or at least partially in contact with the top 18a of the base 18. However, the door(s) 26 may be proximate to or at least partially in contact with the bottom 18b of the base 18 when the door(s) 26 is/are in the first configuration. In the first configuration, the door(s) 26 is/are preferably positioned entirely within an outer periphery of the base 18. From the first configuration, the doors(s) 26 is/are moved downwardly or upwardly within the interior of the base 18 to the second configuration, such that the door(s) 26 form(s) a front wall of the base 18.

One or more hinges (none shown) may pivotally attach the frame 27 to a remainder of the base 18, such as the top 18a or bottom 18b thereof. The frame 27 is preferably pivotable about a second horizontal axis $A_{H2}$ (see FIG. 7). The second horizontal axis $A_{H2}$ preferably extends generally, if not exactly, perpendicularly to the first horizontal axis $A_{H1}$. Each door 26 is preferably pivotally attached to the frame 27, so that each door 26 can pivot or open outwardly about a vertical axis $A_{V1}$, $A_{V2}$ (see FIG. 7) to expose an interior of the base 18. The vertical axes $A_{V1}$, $A_{V2}$ extend generally, if not exactly, perpendicularly to the first horizontal axis $A_{H1}$. As shown in FIG. 1, a handle 52 may extend outwardly from a portion of each door 26 to assist the user in opening and/or closing the door 26. Alternatively, each door 26 may be devoid of a handle, and the doors 26 may be opened by simply grasping a portion of the door 26 or pressing at least slightly inwardly on the door 26 to release a spring-biased catch (not shown).

Figure 8:
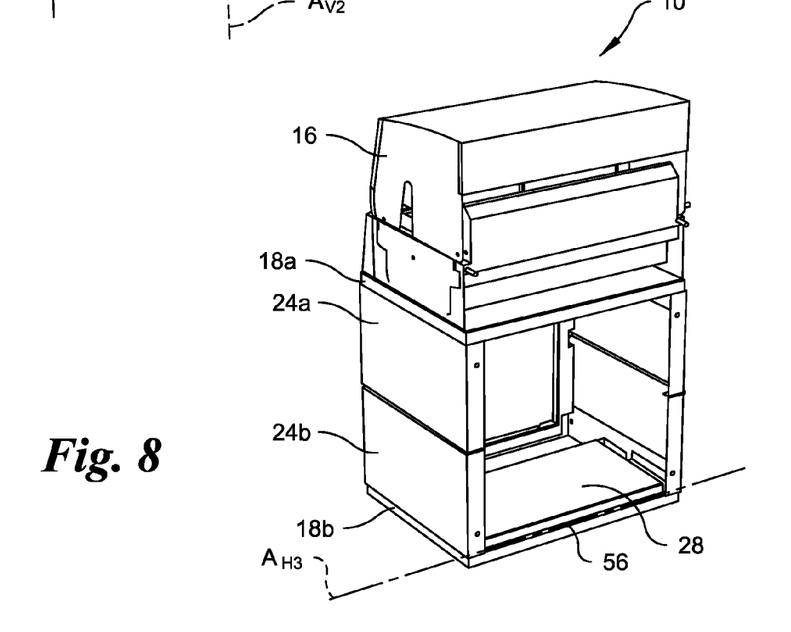
FIG. 8 is a front perspective schematic view of the grill of FIG. 1, wherein the grill is shown in a further partially assembled configuration.
Figure 9:
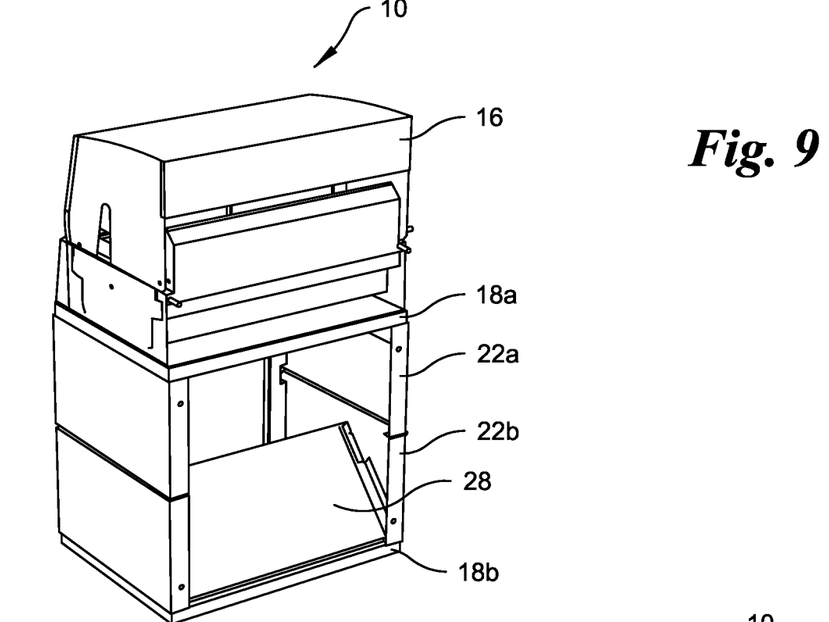
FIG. 9 is a front perspective schematic view of the grill of FIG. 1, wherein the grill is shown in a yet a further partially assembled configuration.
Figure 10:
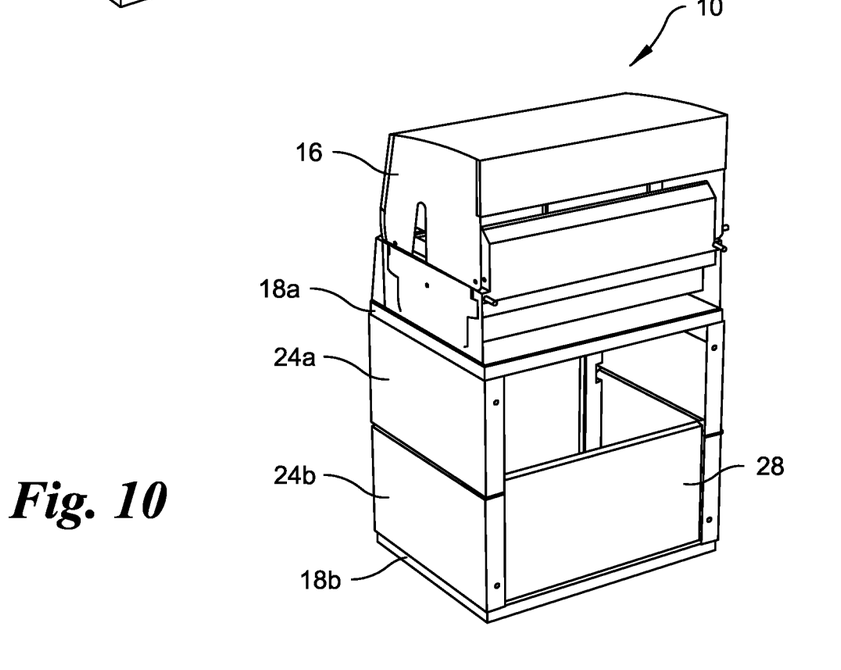
FIG. 10 is a front perspective schematic view of the grill of FIG. 1, wherein the grill is shown in still a further partially assembled configuration.

Referring to FIGS. 2, 5, 6 and 8-10, the base 18 includes a third rear baffle 28 movable between a first, folded or collapsed configuration (see FIGS. 5, 6 and 8) at or near the bottom 18b or the top 18a of the base 18, through a partially unfolded configuration (see FIG. 9), and to a second, unfolded or assembled configuration (see FIGS. 2 and 10). The third rear baffle 28 extends generally, if not exactly, perpendicularly to the first and second side baffles 22, 24 when the third rear baffle 28 is in the unfolded configuration. The third rear baffle 28 may extend proximate to and generally parallel with the bottom 18a of the base 18 and may be pivoted upwardly within the interior of the base 18 to move from the first configuration to the second configuration. As shown in FIG. 8, one or more hinges 56 may pivotally attach the third rear baffle 28 to a reminder of the base 18 about a third horizontal axis $A_{H3}$ (see FIG. 8). The third horizontal axis $A_{H3}$ extends generally, if not exactly, perpendicularly to the first horizontal axis $A_{H1}$ and generally, if not exactly, parallel to the second horizontal axis $A_{H2}$.

As shown in FIG. 2, a height of the third rear baffle 28 may be greater than that of any one of the plates 22a, 22b, 24a, 24b, but less than the total height of the base 18 and/or each side baffle 22, 24. As a result, a gap or spacing may exist between a top of the third rear baffle 28 and a bottom of the cooking unit 12 when the grill 10 is in the fully assembled configuration. When the grill 10 is in the fully assembled configuration (see FIGS. 1 and 2), the first and second side baffles 22, 24, the third rear baffle 28 and the doors 26 generally surround the tank 30 and/or the interior cavity of the base 18. The third rear baffle 28 may be moved into the desired position (FIGS. 2 and 10) before or after the door(s) 26 are moved into the desired position (FIGS. 1 and 7). Those skilled in the art realize that the above-described features of the base 18 are not limited to use as part of a grill 10 and/or with a cooking unit. For example, the base 18 could be used to support nearly any structure, such as a beverage cooler, a stereo, a table top or the like, above the support surface 20.

The first and second side baffles 22, 24, the third rear baffle 28 and the doors 26 of the base 18 are preferably formed of a light weight, high strength material. For example, each of the above components of the base 18 may be formed of a metallic alloy material or a polymeric material. Regardless, the above components of the base 18 are preferably formed of a sufficiently rigid or stiff material that is capable of supporting the weight of the cooking unit 12 above the support surface 20. For example, one or more components of the base 18 may be formed of pressed sheet metal.

In operation, after purchasing the grill 10 from a retailer or manufacturer, for example, the user may remove any packaging that surrounds the grill 10 and possibly remove the grill 10 from a box. At this point, the grill 10 is preferably in the compact configuration shown in FIG. 2. To begin to assemble the grill 10, the cooking unit 12 is preferably raised upwardly so that the side baffles 22a, 24a, 22b, 22b are reconfigured from the folded configuration (FIG. 3), through the partially unfolded configuration (FIG. 4), and to the unfolded configuration (FIGS. 1, 2 and 5-16). The side baffles 22a, 24a, 22b, 22b may automatically lock into place when in the unfolded configuration, or the user(s) may engage one or more locks or latches 48 (see FIG. 2) to maintain the side baffles 22a, 24a, 22b, 22b in the expanded configuration. Next, either the door(s) 26 or the third rear baffle 28 may be unfolded into the desired position. For example, as shown in FIG. 6, the user may rotate the frame 27 and/or the door(s) 26 downwardly from the upper portion 18a of the base 18 and into the position shown in FIG. 7. Additionally, as shown in FIG. 8, the user may rotate the third rear baffle 28 upwardly from the lower portion 18b of the base 18 and into the position shown in FIGS. 2 and 10.

Figure 11:
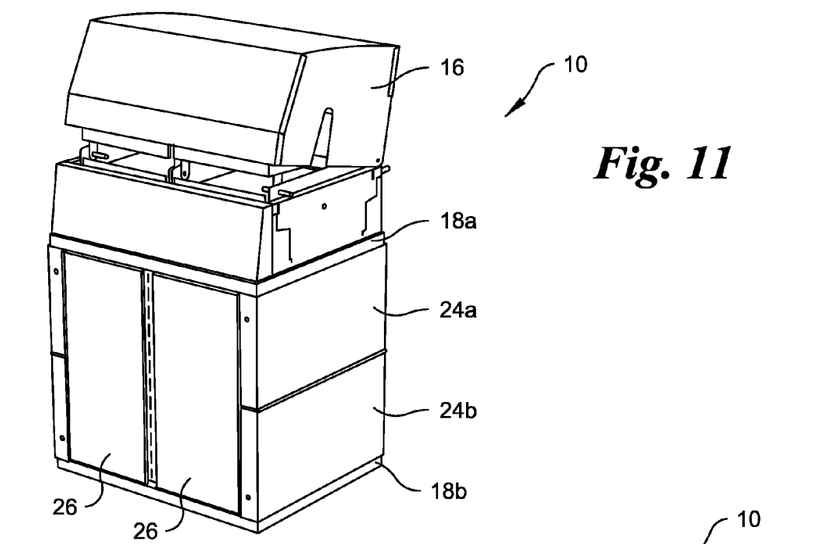
FIG. 11 is a front perspective schematic view of the grill of FIG. 1, wherein the grill is shown in an additional partially assembled configuration.
Figure 12:
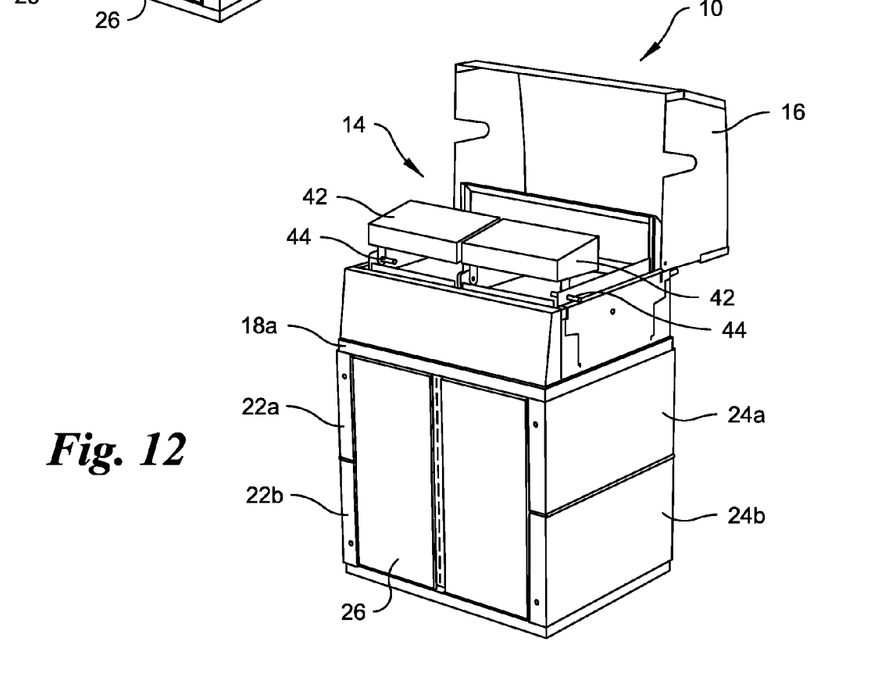
FIG. 12 is a front perspective schematic view of the grill of FIG. 1, wherein the grill is shown in yet an additional partially assembled configuration.
Figure 13:
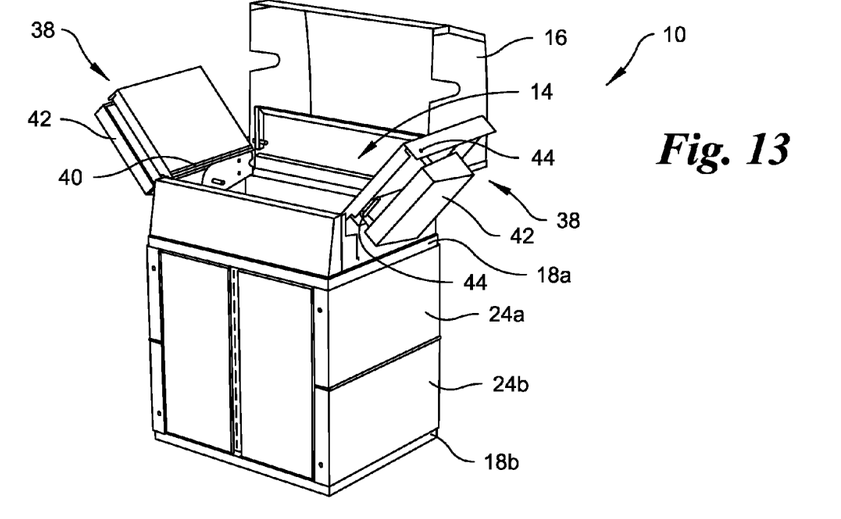
FIG. 13 is a front perspective schematic view of the grill of FIG. 1, wherein the grill is shown in still an additional partially assembled configuration.
Figure 14:
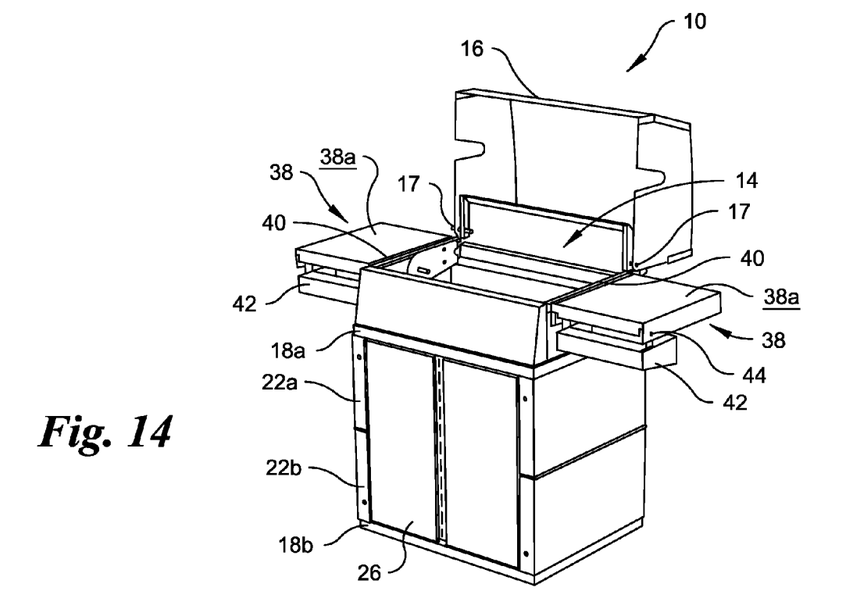
FIG. 14 is a front perspective schematic view of the grill of FIG. 1, wherein the grill is shown in an advanced partially assembled configuration.
Figure 15:
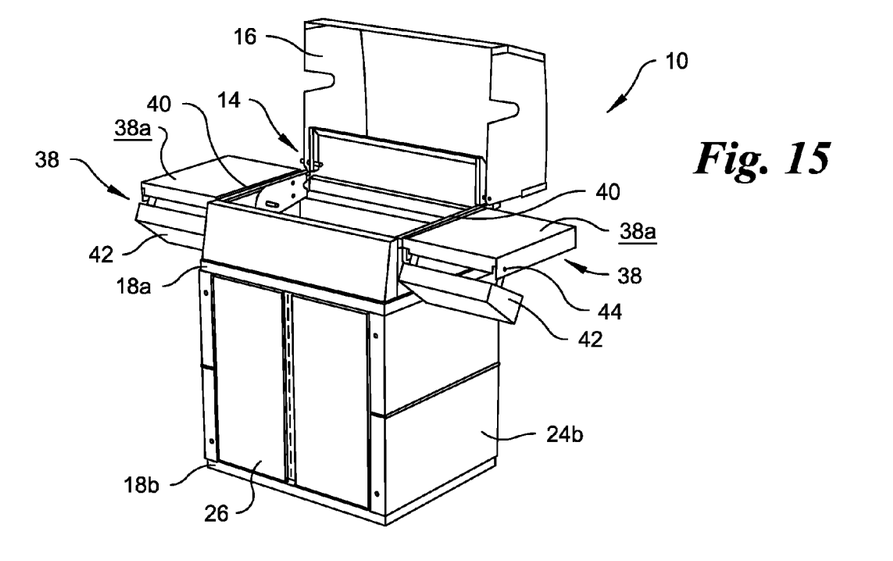
FIG. 15 is a front perspective schematic view of the grill of FIG. 1, wherein the grill is shown in yet a more advanced partially assembled configuration.
Figure 16:
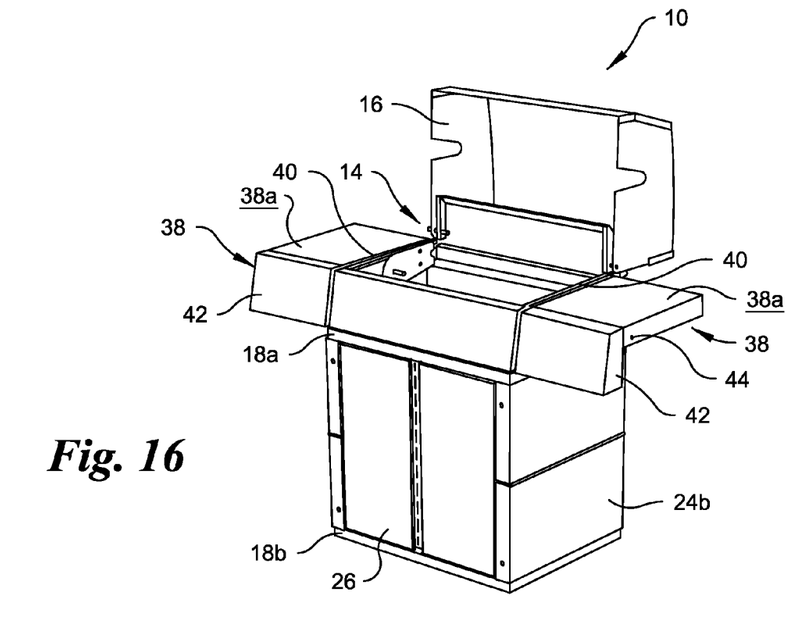
FIG. 16 is a front perspective schematic view of the grill of FIG. 1 in a fully assembled configuration.

The shelves 38 may be removed, unfolded and/or attached to the exterior of the cooking unit 12 either before, after or even during assembly or unfolding of the base 18. In particular, as shown in FIGS. 11 and 12, the lid 16 is preferably first moved from the closed position to the open position to expose the shelves 38. The shelves 38 may then be rotated upwardly and/or outwardly from the heating cavity 14 through the position shown in FIG. 13 and to the position shown in FIG. 14. The tray(s) 42 may then be pivoted or unfolded into position as shown in FIGS. 15 and 16. Alternatively, the shelves 38 may be separated from the cooking unit 12 and then reattached as described below. The grill 10 may be returned to the original compact configuration of FIG. 3 by reversing the above-described steps.

Figure 17:
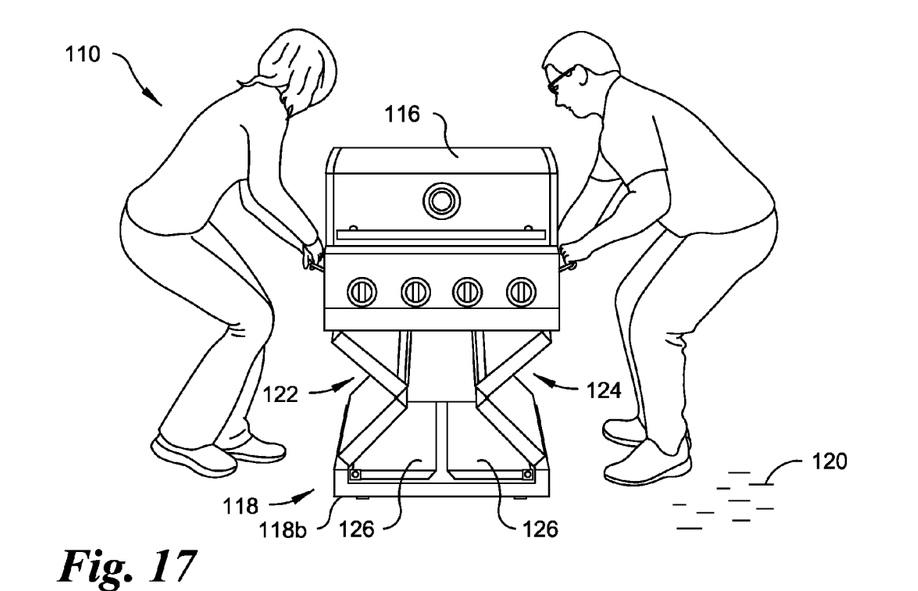
FIG. 17 is a front perspective view of a grill in accordance with a second embodiment of the present disclosure, wherein the grill is shown being assembled.
Figure 18:
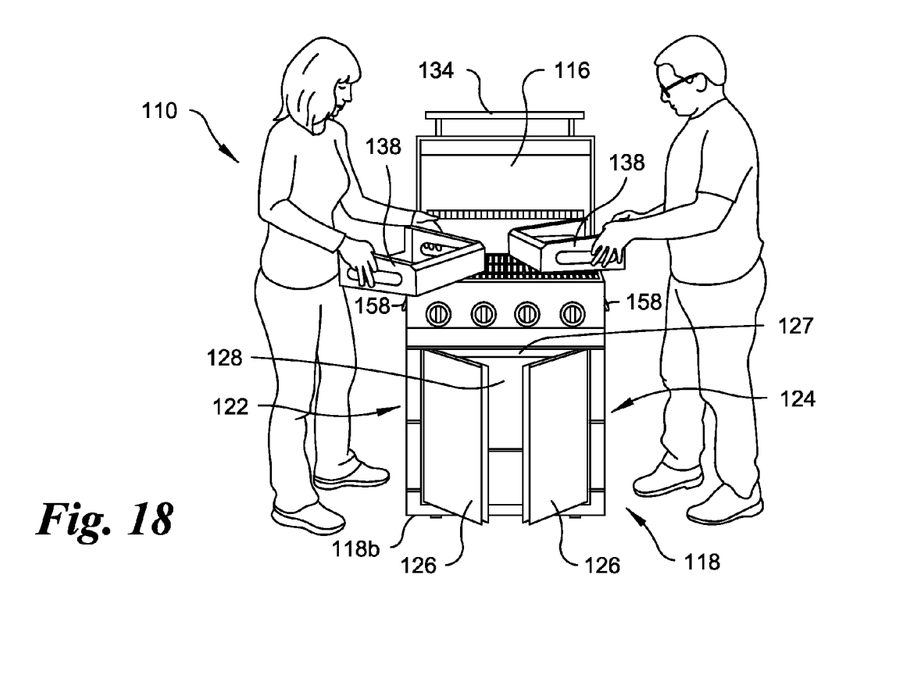
FIG. 18 is a front perspective view of the grill of FIG. 16 in a further stage of assembly.
Figure 19:
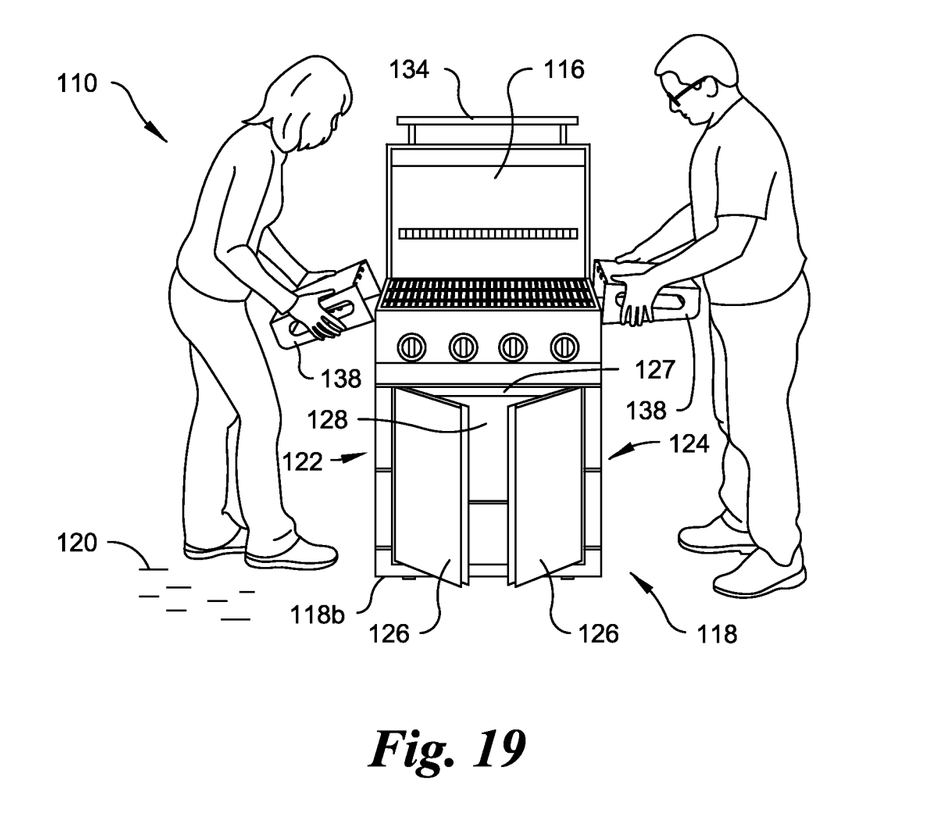
FIG. 19 is a front perspective view of the grill of FIG. 16 in yet a further state of assembly.

FIGS. 17-19 illustrate a second preferred embodiment of a grill 110 of the present disclosure. The reference numerals of the present embodiment are distinguishable from those of the earlier embodiment by a factor of one hundred (100), but otherwise indicate the same elements as indicated above, except as otherwise specified. The grill 110 of the present embodiment is substantially similar to that of the earlier embodiment. While certain like reference numerals may be shown in FIGS. 17-19, the description of certain similarities between the embodiments may be omitted herein for the sake of brevity and convenience, and, therefore, is not limiting.

FIGS. 17-19 depict one method of assembling the grill 110, wherein the shelves 138 are removable from and reattachable to the cooking unit 112. A method of assembling the grill 110 of the second embodiment includes placing at least the bottom of the base 118 and/or the grill 110 on the support surface 120. One or more users then raise at least a portion of the grill 110, such as the cooking unit 112, upwardly with respect to the support surface 120, such that the bottom 118b of the base 118 and/or the grill 110 generally maintains contact with the support surface 120 and the legs 122, 124 of the grill 110 unfold from a compact configuration to an expanded configuration.

In particular, one or more doors 126 can be pivoted downwardly from within an interior of the grill 110 or the base 118 to form a front wall of the grill 110. The door(s) 126 is/are then preferably pivoted radially outwardly to expose at least a portion of the interior of the base 118. Either before or after the above-described movement, the third rear baffle 128 can be pivoted upwardly from within the interior of the base 118 and/or the grill 110 to form a rear wall of the base 118 and/or the grill 110. The above steps are preferably performed without the use of conventional tools.

The lid 116 of the grill 110 can be opened to expose the at least one shelf 138. As shown in FIG. 19, the shelf 138 can be removed from an interior of the of the cooking unit 112 by separating the shelf 138 from a remainder of the grill 110. As shown in FIG. 19, each shelf 138 can be attached to at least a portion of an exterior of a side of the grill 110 and/or the cooking unit 112. In particular, as shown in FIG. 18, one or more engagement members 158, such as bolts, rails, brackets or slots, may be formed in, extend outwardly from, and/or attached to a portion of the exterior of the grill 110 and/or the cooking unit 112. The engagement members 158 may be sized, shaped, positioned and/or configured to receive at least a portion of one of the shelves 138 therein to support the shelf 138 above the ground surface 120. The grill 110 may be returned to the compact configuration by reversing the above-described steps.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

What is claimed is:

1. A method of assembling a grill, the method comprising:
   placing at least a bottom of a grill in a compact configuration on a support surface;
   raising at least a portion of the grill upwardly with respect to the support surface such that the bottom of the grill generally maintains contact with the support surface and side baffles of the grill automatically unfold from the compact configuration to an expanded configuration, in the expanded configuration the side baffles extending generally perpendicularly to the support surface to support the grill;
   opening a lid of the grill to expose at least one shelf;
   removing the shelf from the interior of the grill by separating the shelf from a remainder of the grill; and
   attaching at least a portion of the shelf to at least a portion of an exterior of the grill.

2. The method according to claim 1, further comprising:
   moving one or more doors downwardly or upwardly about a first axis from within an interior of the grill to form a front wall of the grill.

3. The method according to claim 2, further comprising:
   pivoting the door about a second axis outwardly to expose the interior of the grill,
   wherein the first axis extends generally perpendicularly to the second axis.

4. The method according to claim 3, further comprising:
   pivoting a baffle one of upwardly or downwardly from within the interior of the grill to form at least a portion of a rear wall of the grill.

5. A grill comprising:
a cooking unit defining a heating cavity for receiving and heating foodstuff, the cooking unit including a lid for selectively opening and closing the heating cavity; and
a base supporting the cooking unit above a support surface, the base including a first side baffle and an opposing second side baffle, each side baffle including a first plate pivotally attached to a second plate, the plates being pivotable between a first configuration and a second configuration, in the first configuration the plates extending generally parallel to one another and the support surface, in the second configuration the plates extend generally parallel to and abutting one another and generally perpendicularly to the support surface, the base further comprising a pair of pivotable doors on a front thereof, the base including a third rear baffle extending generally perpendicularly to the first and second side baffles.

6. The grill according to claim 5, wherein the first and second side baffles, the third rear baffle and the doors surround a tank containing fuel.

7. The grill according to claim 5, further comprising:
one or more shelves, each shelf having a use position in which the shelf extends laterally outwardly from the cooking unit and a storage position in which the entire shelf is positioned within the cooking unit.

8. The grill according to claim 7, wherein each shelf is pivotally attached to at least a portion of the cooking unit.

9. The grill according to claim 7, wherein each shelf is removably attachable to the cooking unit.

10. A method of assembling a grill, the method comprising:
placing at least a bottom of a grill in a compact configuration on a support surface;
raising at least a portion of the grill upwardly with respect to the support surface such that the bottom of the grill generally maintains contact with the support surface and side baffles of the grill automatically unfold from the compact configuration to an expanded configuration, in the expanded configuration the side baffles extending generally perpendicularly to the support surface to support the grill;
moving one or more doors downwardly or upwardly about a first axis from within an interior of the grill to form a front wall of the grill;
pivoting the door about a second axis outwardly to expose the interior of the grill, wherein the first axis extends generally perpendicularly to the second axis; and
pivoting a baffle upwardly or downwardly from within the interior of the grill to form at least a portion of a rear wall of the grill;
pivoting a baffle one of upwardly or downwardly from within the interior of the grill to form at least a portion of a rear wall of the grill.

* * * * *